ic appearance when dried, comprising a metallic bronze in an aqueous alkali silicate solution of silica to alkali oxide ratio of 3.4 to 1.0 or higher, the content of silicate in the vehicle being within 12% of the silicate content at which gelation occurs.

UNITED STATES PATENT OFFICE 2,284,279

QUICK DRYING INTAGLIO MARKING COMPOSITION

Paul W. Greubel, Long Island City, N. Y., assignor to Interchemical Corporation, New York, N. Y., a corporation of Ohio No Drawing. Application June 22, 1939,
Serial No. 280,522

4 Claims. (Cl. 106—20)

This invention relates to quick drying intaglio marking compositions, and has particular reference to novel metal bronze decorating compositions in which special aqueous alkali silicate solutions are used as the vehicles.

The use of metal powders (known as bronzes) to produce metallic effects is well known. The brilliancy of the effect produced depends to a large extent on the "leafing" of the powders in the vehicle; this phenomenon appears to be due to the tendency of the individual flakes of metal to float on the surface during the drying of the vehicle, the production of a metallic effect depending on proper orientation.

The effects produced by bronzes in aqueous vehicles in use heretofore have been noticeably poor; for some reason, a suitably metallic appearance is never obtained. This is true with aqueous shellac, casein, glues and with conventional alkali silicates.

I have discovered that very noticeably improved leafing can be obtained with bronzes in an aqueous medium by using as the medium an aqueous solution of an alkali silicate in which the ratio of $SiO_2$ to alkali oxide is 3.4 to 1.0 or higher, provided that the silicate content of the medium is within 12% of the content at which gelation occurs.

Silicates having a silicate/alkali oxide ratio of 3.4 to 1.0 or higher show a rather peculiar relationship between solid content and viscosity. As the percentage of silicate increases in a water solution of one of these silicates, the viscosity goes up slowly, until a point is reached at which the curve breaks sharply, after which viscosity increases rapidly with increase of silicate, until a gel is obtained. It has been found that when the silicate content of such a silicate solution is maintained within 12% of this gel point, the paper absorbs sufficient water from the silicate so that the loss of this water causes substantially immediate setting of the silicate, due to its rapid conversion to a solid at the gel point.

It is this immediate setting of the silicate to which I attribute my improved results. I believe that the preliminary leafing of the bronze is satisfactory in most aqueous media directly after application, but that the metallic effect is impaired by passage of water vapor through the top layer during drying, with consequent disturbance of the orientation. As these vehicles set up by absorption of a very small quantity of water, the original leafed surface is immediately set against further disturbance, yielding a perfectly leafed film of high gloss.

Sodium silicate having a ratio of 3.4 $SiO_2$ to 1.0 $Na_2O$ gives a gel point on the viscosity curve at between 42 and 43% of silicate, while gloss is lost if the vehicle is printed on paper below about 30 to 31% silicate content. Sodium silicate having a 3.9 to 1.0 silica to alkali ratio produces a gel point at about 34% solids, and loss of gloss at about 26% solids, while a potassium silicate of 3.9 to 1.0 silica to alkali ratio gives a gel at about 30% silicate solids and loss of gloss at about 24% silicate solids. The position of the gel point may be varied by the addition of bodying agents such as butanol and thinning agents such as glucose; but the relationship between permissible solids and gel point is maintained. The addition of bronze powders ordinarily has only a slight effect on the gel point, depressing it by one percent or so.

Because of the reduction in the amount of solid material necessary to produce acceptable prints, because of the greater factor of safety as regards water sensitivity, and because of their reduced tendency to react with aluminum, I prefer to use silicates having a silica to alkali ratio of 3.9 to 1.0 or more. With such silicates, it is necessary to maintain the silicate solids of the ink within 8% of the silicate content of the gel point; in preferred practice, I operate within 4% of the gel point.

Typical examples of my invention are the following:

Example 1

| | Parts |
|---|---|
| Aluminum bronze | 4.0 |
| Potassium silicate | 96.0 |

(Silicate/oxide ratio—3.9 to 1.0, 27% solids in water.)

Stir bronze powder well into silicate several hours to immediately before use.

Example 2

| | Parts |
|---|---|
| Aluminum bronze | 4.0 |
| Sodium silicate | 96.0 |

(31% solids, silicate/oxide ratio 3.9 to 1.0.)
Stir bronze into silicate, as before.

Other combinations can, of course, be used without departing from the scope of the invention, which is defined in the claims. The compositions may be applied by intaglio, to produce both designs and overall coating.

I claim:

1. A quick drying intaglio marking composition adapted to produce glossy prints of metallic appearance, comprising a dispersion of bronze powder in an alkali silicate solution, the alkali silicate containing from 3.4 to about 3.9 mols of silica per mol of alkali oxide, and the solids content of the silicate ranging from between 30 and 42% for the 3.4 to 1 silica/alkali ratio to between 24 and 34% for the 3.9 to 1 silica/alkali ratio.

2. A quick drying intaglio marking composition adapted to produce glossy prints of metallic appearance, comprising a dispersion of bronze powder in an alkali silicate solution, in which the silicate has a silica/alkali oxide ratio of about 3.9 to 1.0 and a solids content of from about 27% to about 31%.

3. A quick drying intaglio marking composition adapted to produce glossy prints of metallic appearance, comprising a dispersion of aluminum bronze in a sodium silicate solution containing from 26 to 34% of sodium silicate having a $SiO_2$-$Na_2O$ ratio of about 3.9 to 1.0.

4. A quick drying intaglio marking composition adapted to produce glossy prints of metallic appearance, comprising a dispersion of aluminum bronze in a potassium silicate solution containing from 24 to 30% potassium silicate having a $SiO_2$-$K_2O$ ratio of about 3.9 to 1.0.

PAUL W. GREUBEL.